S. WEST.
Baking Pan.

No. 59,732.

Patented Nov. 13, 1866.

WITNESSES:

INVENTOR.

UNITED STATES PATENT OFFICE.

STEPHEN WEST, OF TRENTON, NEW JERSEY, ASSIGNOR TO WEST & THORN.

IMPROVED BAKING-PAN.

Specification forming part of Letters Patent No. 59,732, dated November 13, 1866.

*To all whom it may concern:*

Be it known that I, STEPHEN WEST, of Trenton, Mercer county, State of New Jersey, have invented a new and Improved Baking-Pan; and I do hereby declare that the following is a full, clear, and exact description thereof, which will enable others skilled in the art to make and use the same, reference being had to the accompanying drawings, forming part of this specification.

The present invention relates to an improved baking-pan, which is designed to be used in the baking of fancy crackers having a cylindrical shape; and it consists in forming the bottom of the pan with a series of semicircular corrugations, grooves, or channels to receive and hold the material (first rolled rolled into the proper shape) of which such crackers is composed during the baking operation, whereby the flattening of the crackers is prevented and their round or cylindrical shape retained, this corrugation of the pan also greatly strengthening it, thus increasing its durability and utility.

In addition to the above, the pan is so constructed as to enable the cutting of the cracker material placed in it to be cut into the proper or desired lengths for the crackers, as will be hereinafter fully described.

Figure 1:
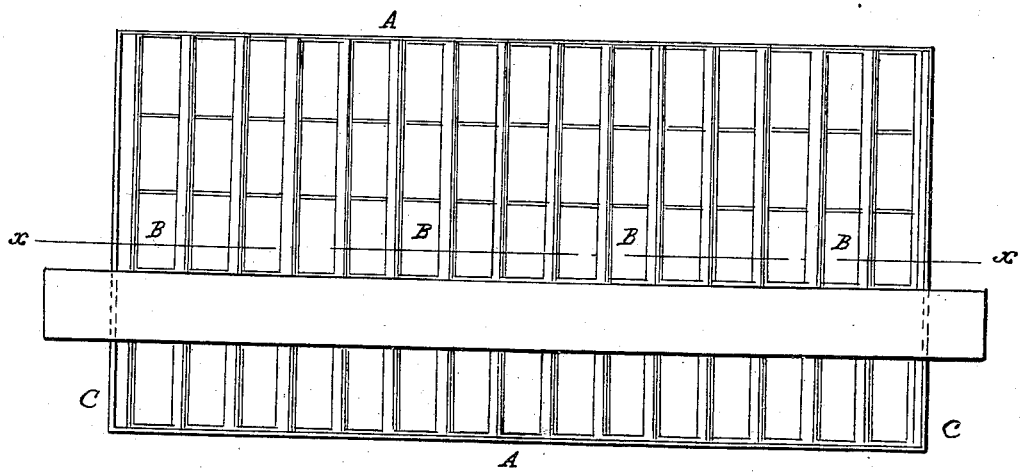
Figure 2:
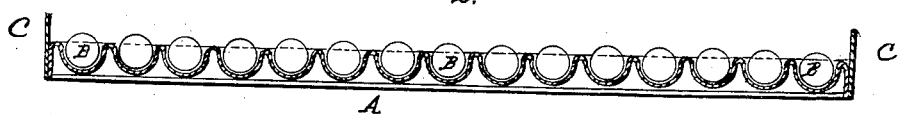
Figure 3:

In accompanying plate of drawings my improved baking-pan is illustrated, Figure 1 being a plan or top view of the same; Fig. 2, a vertical section, taken in the plane of the line *x x*, Fig. 1; and Fig. 3, an end view.

A in the drawings represents the pan, which is to be made of sheet metal or any other suitable material, and is to be formed with a series of semicircular-shaped corrugations, grooves, or channels, B, which, in the present instance, extend in lines parallel to each other and across the width of the pan. In these grooves or corrugations B the material of which the crackers are to be made, first having been rolled into the proper cylindrical shape, is laid, as plainly shown in red in the drawings, Figs. 1 and 2, the circular shape of the said channels preventing the crackers from flattening, and preserving their cylindrical or round shape during the operation of the baking as well, also, as imparting great strength and durability to the pan.

At each end of the pan a notched strip, C, is secured, the teeth D of both of which project above the pan, and are in each case at equal distances apart, so that if a roll is laid upon the pan against the corresponding tooth of each of its end strips the edge of such rule will be in a parallel line with the side of the pan, the object of these notched strips at each end of the pan being to enable the several rolls of cracker material placed in the grooves of the pan to be readily cut into pieces of the proper or desired lengths.

I claim as new and desire to secure by Letters Patent—

A baking-pan having a grooved or corrugated bottom, B, and notched end piece C, and for the purpose herein described and represented.

STEPHEN WEST.

Witnesses:
 I. C. SMITH,
 JAMES H. SMITH.